United States Patent [19]
Bendelac et al.

[11] Patent Number: 5,566,308
[45] Date of Patent: Oct. 15, 1996

[54] PROCESSOR CORE WHICH PROVIDES A LINEAR EXTENSION OF AN ADDRESSABLE MEMORY SPACE

[75] Inventors: Chaim Bendelac, Kfar Saba; Dan Biran, Raanana; Ohad Falik, Petar-Tikva; Gadi Erlich, Moshav Kfar Chaim; Jonathan Levy, Herzlia B'; Gideon Intrater, Ramat Hasharon, all of Israel

[73] Assignee: National Semiconductor Corporation, Santa Clara, Calif.

[21] Appl. No.: 248,769

[22] Filed: May 25, 1994

[51] Int. Cl.$^6$ .................................................. G06F 12/00
[52] U.S. Cl. ..................... 395/402; 395/401; 395/427; 395/375; 395/412; 395/421.02; 365/230.01
[58] Field of Search .................. 365/230.01, 189.11; 395/400, 402, 410, 412, 425, 375, 401, 427, 402, 421.02

[56] References Cited

U.S. PATENT DOCUMENTS

| | | |
|---|---|---|
| 3,602,889 | 8/1971 | Gayman et al. |
| 4,090,237 | 5/1978 | Dimmick. |
| 5,155,812 | 10/1992 | Ehlig et al. ........................ 395/275 |
| 5,179,676 | 1/1993 | Kashima ............................ 345/400 |
| 5,210,839 | 5/1993 | Powell et al. ..................... 395/400 |
| 5,233,699 | 8/1993 | Wu et al. .......................... 395/402 |
| 5,249,280 | 9/1993 | Nash et al. ....................... 395/425 |

FOREIGN PATENT DOCUMENTS 510635  10/1995  European Pat. Off. .

OTHER PUBLICATIONS

"Copy Carry to Bank Address Register Instruction," *IBM Technical Disclosure*, vol. 28 No. 12 (May 1986).

"128k–Byte proessor instruction address space for each level status block" *IBM Technical Disclosure*, vol. 30 No. 7 (Dec. 1987).

Parson, "Flexible Storage Addressing," *IBM Technical Disclosure Bulletin*, vol. 6 No. 12 (May 1964).

Deutsch et al. "Dual–mode Language Programming," *IBM Technical Disclosure Bulletin*, vol. 11 No. 6 (Nov. 1968).

*Primary Examiner*—Viet Q. Nguyen
*Attorney, Agent, or Firm*—Limbach & Limbach L.L.P.

[57] ABSTRACT

A processor core for provides a linear extension of addressable memory space of a microprocessor with minimal additional hardware and software complexity. A N+x bit pointer register (e.g. program counter) holds an N+x bit instruction address. The N+x bit instruction address provides to an execution unit a pointer to an instruction in the memory to be processed by the execution unit. An encoder encodes the N+x bit address into an N bit encoding of the N+x bit address. The processor core can thereby address $2^x$ times more memory locations than $2^N$. Two other registers each hold a portion of an data address (i.e. a pointer to a datum in memory to be operated on). An address former concatenates the portions of the address in the two registers to form the data address. Therefore, the address is formed from portions of the data address stored in multiple registers without performing any arithmetic on the portions.

14 Claims, 5 Drawing Sheets

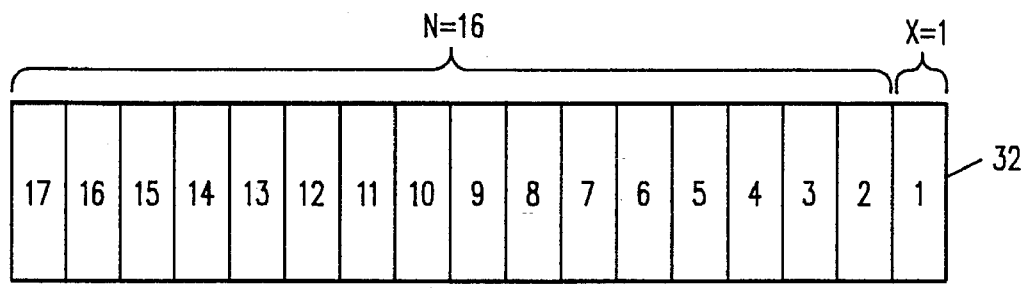
FIG. 2
| 50 | BAL | Rd, disp | Branch and link |
| 52 | EXCP | vector | Trap (vector) |
| 54 | Jcond | cond, Rd | Conditional Jump |
| 56 | JAL | Rlink, Rd | Jump and link |
| 58 | JUMP | Rd | Jump |
| 60 | RETX | | Return from exception |
FIG. 3
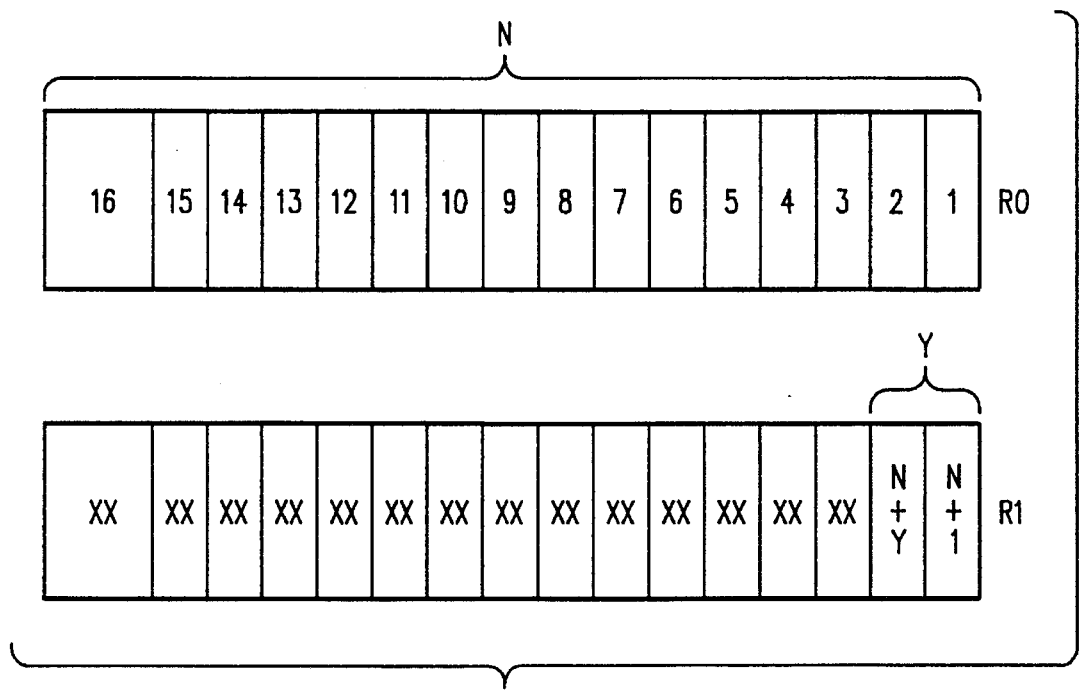
FIG. 6

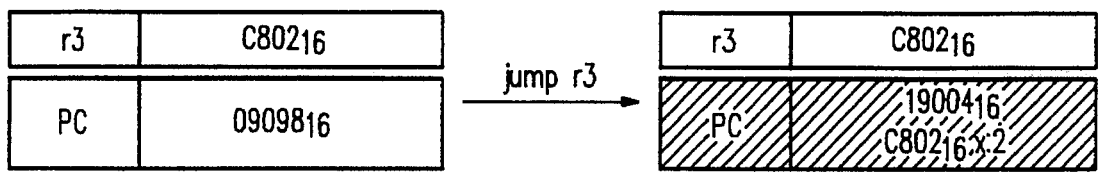
FIG. 4D
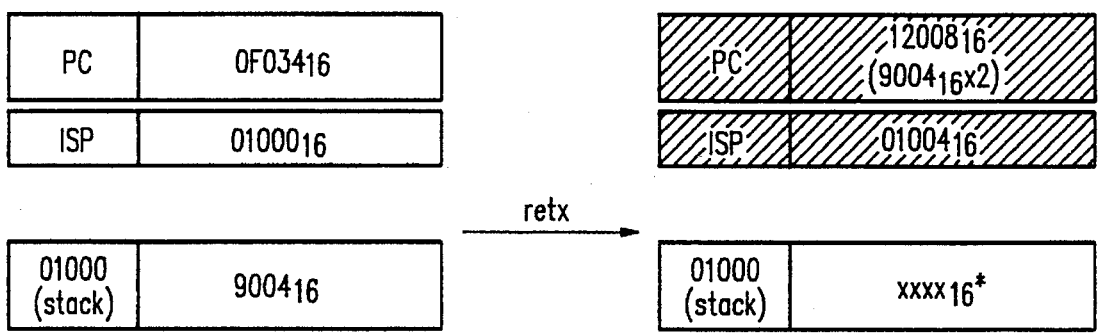
FIG. 4E
BAL Instruction
| 31 17 | 16 | 15 14 | 13 | 12 9 | 8 5 | 4 1 | 0 |
|---|---|---|---|---|---|---|---|
| disp (d15–d1) | 0 | 00 | 1 | 1010 | link–reg | d16 111 | 0 |
FIG. 5
Load/Store Instruction Format, Far Relative
| 31 16 | 15 14 | 13 | 12 9 | 8 5 | 4 1 | 0 |
|---|---|---|---|---|---|---|
| disp (d15–d0) | 1 l/s | i | 11 d17 d16 | reg | base | 1 |
FIG. 7

PROCESSOR CORE WHICH PROVIDES A LINEAR EXTENSION OF AN ADDRESSABLE MEMORY SPACE

COPYRIGHT NOTICE

A portion of the disclosure of this patent document contains material which is subject to copyright protection. The copyright owner, National Semiconductor Corporation, has no objection to the facsimile reproduction by anyone of the patent document or the patent disclosure, as it appears in the Patent and Trademark Office patent file or records, but otherwise reserves all copyright rights whatsoever.

TECHNICAL FIELD OF THE INVENTION

The present invention relates to microprocessor architectures and, in particular, to a processor core which provides a linear extension of an addressable memory space.

BACKGROUND OF THE INVENTION

With microprocessor architectures, the number of memory space locations which a particular processor can address is limited by a number of factors. One limiting factor is the number of bits available (typically 16 bits) within the processor's internal registers, where memory space addresses are stored. Since the processor's stack is used for temporary storage of memory space location addresses, the bit-width (typically 16 bits) of the processor's stack is also a limiting factor. Another limiting factor is the width of the processor's Arithmetic Logic Unit ("ALU"), which calculates memory space addresses. Where storage of addresses is to be in 16 bits, the processor has a limited addressable linear memory space of $2**16=256$ k locations.

A first prior art attempt to overcome these limiting factors is known as the Harvard Architecture, which employs separate code and data memory spaces, effectively doubling the number of addressable memory locations. This architecture has the disadvantage that it makes inefficient use of memory. Available memory, once allocated to either data or code, can not be reallocated. Furthermore, a particular data structure is limited in size to the amount of memory actually allocated to data, and no more.

A second prior art attempt to overcome the limiting factors makes use of software overlays, where code is stored on a secondary storage device, such as a disk drive, during execution of a program, and pieces of the program code are retrieved, as they are needed, from the secondary storage device into the memory. This method does not extend the linearity of the memory space. An architecture which employs software overlays also has the disadvantage of requiring a secondary storage device. Furthermore, the use of overlays adds significant program execution overhead to both manage the overlays and to retrieve the pieces of program code from the external storage device.

A third prior art attempt to overcome the limiting factors employs memory segmentation. For example, the Intel 8086 microprocessor, manufactured by Intel Corporation of Santa Clara, Calif., employs memory segmentation. The Intel 8086 has 16-bit segment registers which provide base addresses for addressing memory segments. For each memory access, a 20-bit address is calculated by adding the contents of the appropriate segment register, multiplied by 16, to an offset specified in the instruction or in another register. The memory segmentation approach has the disadvantage that it increases both software and hardware complexity. It also has the disadvantage that data structures are limited in size and/or must be located near the beginning of a segment, or additional software complexity is required to traverse segment boundaries.

Furthermore, the use of more than one register, where it is necessary to perform arithmetic on the contents of the registers to form an address, is relatively slow.

A fourth prior art attempt to overcome the limiting factors uses bank switching. In one implementation of bank switching, bits from a microprocessor's output port are used to enable separate memory banks or are decoded as the most significant address bits. A problem with the use of bank switching to overcome memory space limiting factors is that bank switching adds significant hardware and software complexity. The bank switching implementations also limit the size of a particular data structure to the size of a memory bank.

SUMMARY OF THE INVENTION

The present invention is a processor core which provides a linear extension of an addressable memory space of a microprocessor with minimal additional hardware and software complexity.

In accordance with a first embodiment of the present invention, an N+x bit pointer register (e.g. a program counter) means of the processor core holds an N+x bit address. The N+x bit address is a pointer to an information entry in the memory which is to be processed by an execution unit of the processor core. An encoder encodes the N+x bit address into an N bit encoding of the N+x bit address.

As a result of the address encoding, the limiting factors of processor core general register width and stack width are overcome, such that the processor core can address $2^x$ times more memory space locations than $2^N$.

In accordance with a further embodiment of the present invention, a processor core comprises at least two register means. Each register means is for holding a portion of an address, where the address is used to form a pointer to a datum in memory to be operated on. An address forming means concatenates the portions of the address in the register means to form the address. Therefore, the address is formed from portions of the address stored in multiple registers without performing any arithmetic on the portions.

A better understanding of the features and advantages of the invention will be obtained by reference to the following detailed description and accompanying drawings which set forth an illustrative embodiment in which the principles of the invention are utilized.

BRIEF DESCRIPTION OF THE FIGURES

FIG. 2 illustrates the program counter register of the processor core of FIG. 1.

FIG. 3 is a table that provides sample assembly language instructions utilizable in accordance with the present invention.

FIGS. 4A–4E illustrate an embodiment of the present invention in the context of the sample assembly language instructions in FIG. 3.

FIG. 5 illustrates the format for encoding a BAL instruction to be executed by the processor core of FIG. 1.

FIG. 6 illustrates a pair of registers for holding a pointer to a datum in memory.

FIG. 7 illustrates the format for encoding a LOAD/STORE instruction to be executed by the processor core of FIG. 1.

DETAILED DESCRIPTION OF THE INVENTION

Figure 1:
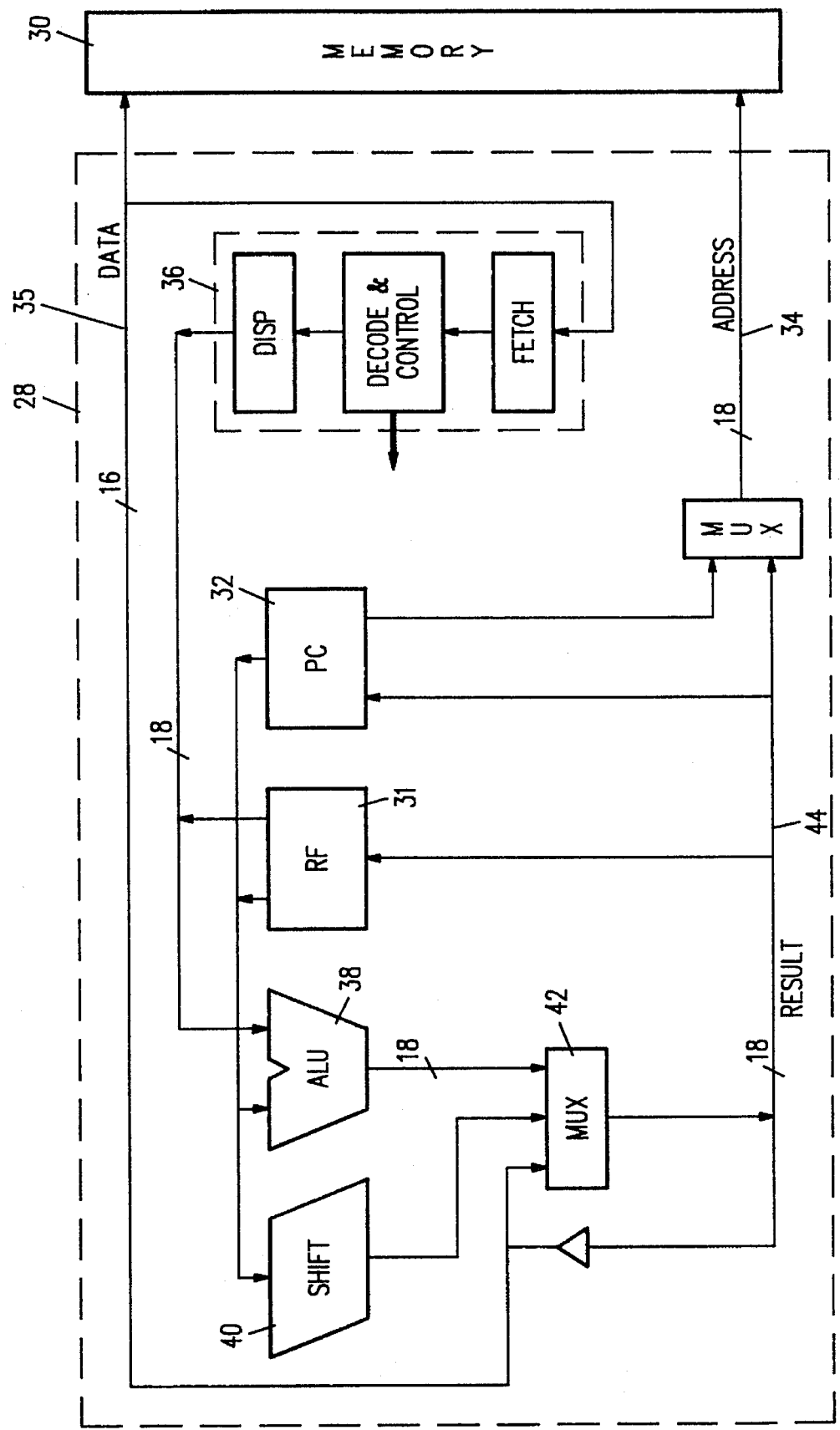
FIG. 1 is a block diagram illustrating a processor core embodying the present invention.

FIG. 1 shows a processor core 28 in accordance with the present invention, interfaced to an external memory 30. Many of the elements shown in FIG. 1 are conventional microprocessor components arranged in a conventional manner. Those conventional components are not described in detail since both their structure and operation are well-known to those skilled in the art.

Linear Extension of Instruction Space

The processor core 28 includes an 18 bit address bus 34, which allows addressing of $2^{18}=256$ k memory locations. The processor core 28 further includes a 17 bit (i.e. N+x bit, where N is 16 and x is 1) program counter register 32, which contains a 17 bit (i.e. N+x bit) address in the memory 30 of the next instruction to be executed. To fetch an instruction to be executed from the memory 30, the contents of the program counter register 32 are padded with a constant zero as a most significant bit and placed onto the 18 bit address bus 34, and the instruction is loaded into an instruction loader 36 via a 16 bit data bus 35.

The program counter register 32 is shown in detail in FIG. 2. The N bit portion of the register is bits 2–17, with bit 2 being the least significant bit of the N bit portion and bit 17 being the most significant bit of the N bit portion. The x bit portion of the register is bit 1.

When the to be executed instruction is a jump/branch instruction, the arithmetic logic unit ("ALU") 38 computes, in N+x bit (i.e. 17 bit) precision, the target address at which instruction execution is to continue and writes the target address to the program counter register 32 via a MUX 42 and a RESULT bus 44. In cases of executing jump/branch instructions with linkage (i.e. for function or subroutine calls), a shifter 40 encodes a copy of the 17 bit (i.e. N+x bit) address of the next sequential instruction (i.e the "return address", which is the contents of the program counter) into a 16 bit (i.e. N bit) encoded address by shifting off the x bit portion of the N+x bit address such that the N bit portion remains. The N bit (i.e. 16 bit) encoded return address is saved to an N bit (i.e. 16 bit) wide stack space, which may be, for example, either in the external memory 30 or internal to the processor core 28. Alternatively, the encoded return address may be saved to one of the general registers in the register file 38, which are also N bits (i.e. 16 bits) wide.

As compared to a conventional processor core which has a 16 bit (i.e. N bit) program counter register and a 16 bit (i.e. N bit) address bus, the processor core 28 in accordance with the present invention can address 2 times (i.e. $2^x$ times) as many memory locations (i.e. $2^x$ times $2^N$)—but the components of the processor core 28 which are used to store addresses (i.e. general purpose registers in the register file 31, stack areas in memory 30 or in the register file 31, etc) need to be only 16 bits (i.e. N bits).

By aligning all instructions stored in the memory 30 on addresses divisible by 2 (i.e. $2^x$), it can be ensured that the address of any instruction to be executed by the processor core 28 has least significant 1 bit (i.e. x bits) of zero. As another, hypothetical, example, in a byte-addressable architecture, the instructions can be aligned on double-word boundaries. Thus, in such an operation of the present invention, whenever a copy of a return address is saved, the address is encoded by saving only the most significant 16 bits (i.e. N bits) of the 18 bit (i.e. N+x bit) address. That is, since the least significant 2 bits (i.e. x bits) of the 18 bit (i.e. N+x bit) address are always zero, the least significant 2 bits (i.e. x bits) need not be represented in the encoded address.

In a complementary fashion, when the 17 bit (i.e. N+x bit) program counter register 32 contents is restored from a 16 bit (i.e. N bit) encoded representation, the instruction address written to the program counter register 32 is shifted to the left, resulting in a least significant 1 bit (i.e. x bits) of zero.

Alternatively, instructions can be aligned on addresses that, although not divisible by $2^x$, have identical remainders when divided by $2^x$, thus ensuring that the address of any instruction to be executed has identical least significant x bits. In this case, also, a return address is encoded by saving only the most significant N bit of the N+x bit address. However, when the N+x bit program counter register 32 contents is restored from an N bit encoded representation, the return address written to the program counter register 32 is assumed to have least significant bits equal to the aforementioned identical remainders.

With reference to FIGS. 4A–4E, the instruction address store/restore mechanism, in accordance with the above-described preferred embodiment, is illustrated in the context of several jump/branch with linkage instructions, shown in assembly language form in FIG. 3. The foregoing illustrations assume that the instructions stored in the memory 30 are all aligned on address boundaries divisible by 2 (i.e. by $2^x$) such that the address of any instruction to be executed by the processor core 28 has least significant 1 bit (i.e. x bits) of zero.

First, a branch and link instruction 50, which is of the form "BAL link, dest," provides an illustration of the address store mechanism. The 17 bit (i.e. N+x bit) return address is stored, from the ALU 38, in encoded form, into the 16 bit (i.e. N bit) register specified by the link field in the instruction 50. The displacement to the instruction at which program execution is to continue may be up to 17 bits (i.e. N+x bits). FIG. 5 shows the encoding of a BAL instruction. As shown in FIG. 5, only the most significant 16 bits (i.e. N bits) of the displacement are encoded directly into the instruction. The actual displacement is obtained by shifting the encoded 16 bit (i.e. N bit) portion of the displacement left by 1 bit (i.e. x bits). The address at which program execution is to continue is obtained by adding the actual displacement to the address contained in the program counter register.

Figure 4A:
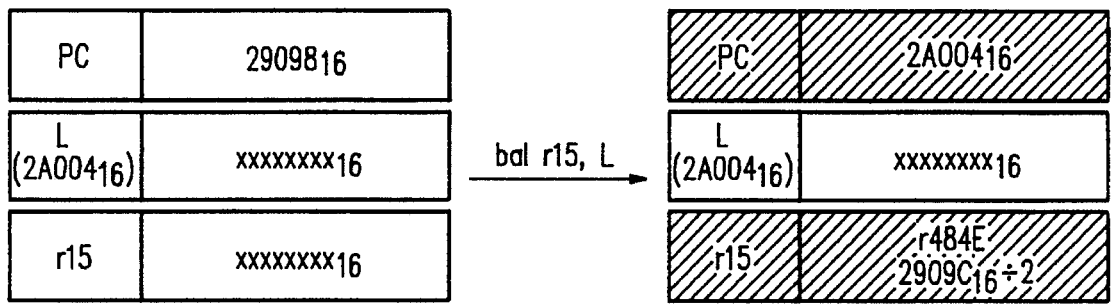

FIG. 4A illustrates an execution of the BAL instruction. Referring to the "bal r15, L" instruction 50 shown in FIG. 4A, the return address is $2909C_{16}$, which is the address of the current (bal) instruction, $29098_{16}$, plus four, the number of bytes in the current instruction. Bits 2–17 of the return address (i.e. the most significant N bits) are saved in the 16 bit (i.e. N bit) link register R15, and execution control is passed to the dest instruction, labelled L, by adding $00F6C_{16}$, which is the offset to L from the address of the BAL instruction 50, to the current PC.

An EXCP instruction 52, which is of the form "EXCP vector," also provides an illustration of the address store mechanism. Before the EXCP instruction activates the trap specified by the vector operand, the return address, in encoded form, is pushed onto the 16 bit (i.e. N bit) wide interrupt stack.

The Jcond instruction 54, which is of the form "Jcond dest," provides an illustration of the address restore mechanism. A two character condition code that describes a flag or flags in a processor status register whose state is to be tested is specified in the cond field of the instruction 54. If the condition specified by the cond field is true, program execution continues at a destination address specified in encoded form in the 16 bit (i.e. N bit) dest register, by restoring the encoded address from the dest register into the most significant 16 bits (i.e. N bits) of the program counter register. The least significant bit (i.e. x bits) of the program counter register are cleared to zero.

Figure 4B:
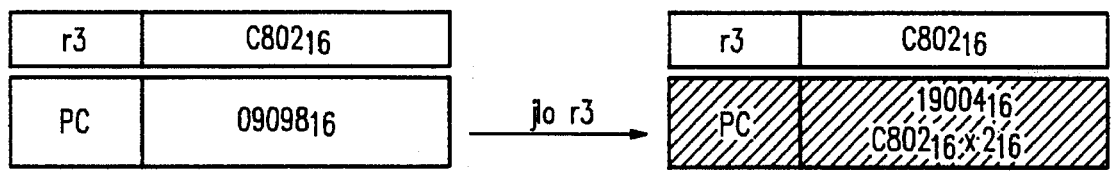

FIG. 4B illustrates an execution of the Jcond instruction. Referring to the "jlo r3" (jump if lower than) instruction shown in FIG. 4B, which checks the state of the processor status register flags PSR.Z and PSR.L. If the processor status register flags PSR.Z and PSR.L are zero, this instruction restores the destination address held in R3 ($19004_{16}$, encoded as $0C802_{16}$) into bits 2–17 of the program counter register, clearing bit 1 of the program counter register. Program execution then continues at the destination address.

The JAL instruction 56, which is of the form "JAL link, dest," provides illustrations of both the store and restore mechanisms. Program execution continues at the destination address encoded in the 16-bit dest register, by restoring the encoded destination address from the dest register into the program counter register and clearing the least significant bit of the program counter register. The return address is stored in encoded form in the link register.

Figure 4C:
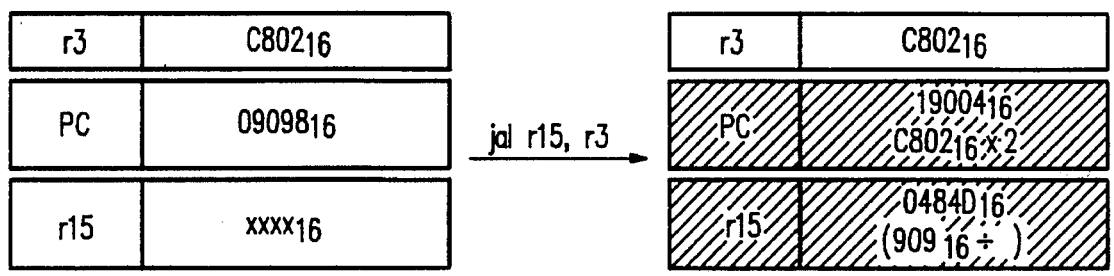

FIG. 4C illustrates an example of the JAL instruction. Referring to the "jal r15, r3" instruction shown in FIG. 4C, this example loads the destination address held in register R3 ($19004_{16}$, encoded as $C802_{16}$) into bits 2–17 of the program counter register and clears bit 1 of the program counter register. The return address is $0909A_{16}$, which is the address of the current instruction (JAL), $09098_{16}$, plus two, the number of bytes in the current instruction. Bits 2–17 of the return address are saved in register R15. Finally, execution control is passed to the instruction at $19004_{16}$.

The JUMP instruction 58, which is of the form "JUMP dest," provides an illustration of the restore mechanism. Execution continues at the encoded destination address held in the dest register by restoring the encoded address from the dest register into the program counter register and clearing the least significant bit of the program counter register.

FIG. 4D shows an example of the JUMP instruction. Referring to the jump r3 instruction shown in FIG. 4D, this example loads the destination address, held in encoded form in register R3, into bits 2–17 of the program counter register, clearing bit 1 of the program counter register. Program execution then continues at the destination address.

The RETX instruction 60 provides an example of the restore mechanism. The RETX instruction returns control from a trap service procedure by continuing execution continues at the return address held in encoded form at the top of the interrupt stack. When the RETX instruction is executed, the encoded return address is popped from the interrupt stack and loaded it into the 16 most significant bits of the program counter register. The least significant 1 bit of the program counter register are cleared. Execution continues at the return address.

FIG. 4E shows an example of the RETX instruction. Referring to the retx instruction shown in FIG. 4E, this example loads the return address ($19004_{16}$, encoded as $C802_{16}$), from its encoded form on the interrupt stack into bits 2–17 of the program counter register, clearing bit 1 of the program counter register. Program execution then continues at $19004_{16}$, the return address.

Linear Extension of Data Space

In accordance with a further embodiment of the present invention, two general registers within the register file 31 (two are shown in FIG. 6, R0 and R1) are concatenated to form a pointer to a datum in memory from the concatenated contents of the two registers. That is, R0 holds 16 bits (i.e. N bits; bits 1, 2, . . . , N) and R1 holds 2 bits (i.e. y bits; bits N+1, N+y). To form an 18 bit (i.e. N+y bit) pointer to a data item, a programmer writes bits 1, 2, . . . , N (i.e. N bits) of the 18 bit (i.e. N+y bit) address to R0 and bits N+1, N+y (i.e. y bits) of the 18 bit (i.e. N+y bit) address to R1. Then, to form an 18 bit address, the 16 bits (i.e. N bits) from R0 are put onto the least significant 16 bits of the ADDRESS bus 34, and the 2 bits (i.e. y bits) from R1 are put onto the most significant 2 bits of the ADDRESS bus 34. That is, the 18 bit address is formed by concatenating the contents of R0 and R1.

FIG. 7 illustrates the format of an instruction (LOAD/STORE) which utilizes an 18 bit (i.e. N+y bit) data reference. Bit 14 of the instruction indicates whether the instruction is a "Load" or a "Store" instruction. Bits 5–8 indicate a register which holds the 16 bit (i.e. N bit) portion of the base address of a pointer to a data reference; the next consecutively numbered register holds the 2 bit (i.e. y bit) portion of the base address of the pointer to the data reference. Bits 9–10 and 16–31 hold the 18 bits (i.e. N+y bits) of the displacement of the pointer. The complete address of the pointer is formed by adding the base address to the displacement.

Figure 8:
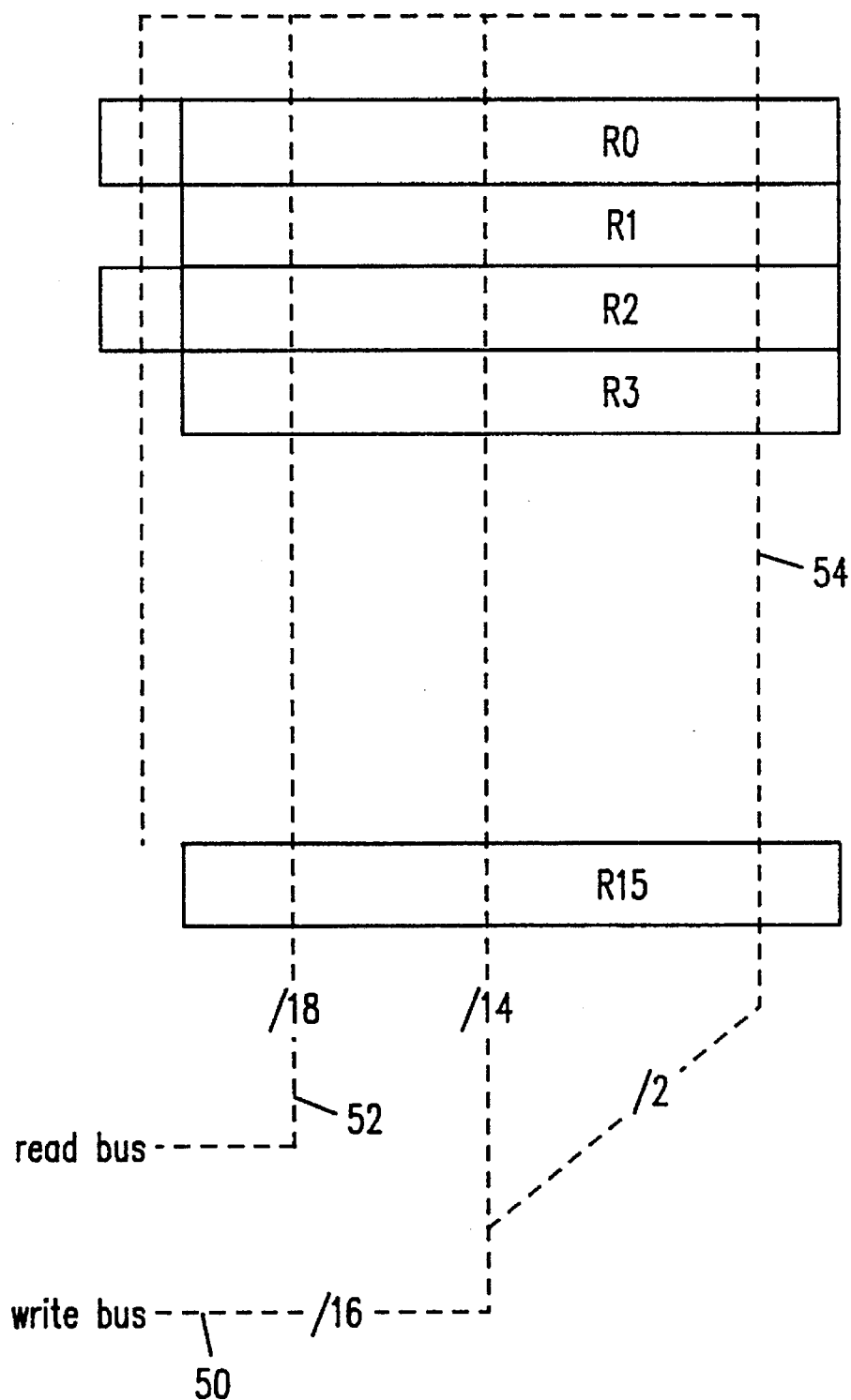
FIG. 8 illustrates the general purpose registers of the register file of the processor core of FIG. 1.

FIG. 8 shows a preferred embodiment of the present invention register concatenation embodiment of FIG. 6. In accordance with the preferred embodiment, while to a programmer it appears that the registers R0 and R1 are each 16 bits (i.e. N bits), register R0 actually has 18 bits; the two most significant bits are inaccessible to the programmer directly. As with the previously described embodiment, the 16 bit (i.e. N bit) portion of the address is written to R0 (i.e. the least significant 16 bits of R0) via the write bus 50. When the 2 bit (i.e. y bit) portion of the address is written into R1 via the write bus 50, the 2 bits are also written into the most significant 2 bits of R0 via a 2-bit portion 54 of the write bus 50. Thus, R0 contains the complete 18 bit (i.e. N+y bit) pointer value.

When an indirect memory reference is made by the programmer designating the R0/R1 pair as containing the pointer value, the 18-bit pointer value is read directly out of the 18-bit register R0 on an 18-bit read bus 52. There is no need to access R1 at all, nor is there need to combine the contents of multiple registers to form the 18-bit pointer value.

It should be understood that various alternatives to the embodiments of the invention described herein may be employed in practicing the invention. It is intended that the following claims define the scope of the invention and that methods and apparatus within the scope of these claims and their equivalents be covered thereby.

What is claimed is:

1. A processor core that retrieves information from a memory and processes the information, comprising:

(a) an execution unit that processes information;

(b) an N+x bit pointer register means for holding one of a plurality of N+x addresses, wherein said one N+x bit address provides to the execution unit a pointer to an information entry in the memory to be processed by the execution unit;

(c) an encoding means for encoding said one N+x bit address into an N bit encoding of said one N+x bit address;

(d) a linkage register means for holding said N bit encoding of said one N+x bit address; and (e) a decoding means for decoding said one N+x bit address from said N bit encoding of said one N+x bit address held in said linkage register means whereby the processor core can address $2^x$ times more memory locations than $2^N$.

2. A processor core that processes information retrieved from a memory, comprising:

(a) an execution unit that processes information;

(b) a decoding means for decoding an N bit encoding of one of a plurality of N+x bit addresses into one of said N+x bit addresses by combining x bits, each of which has a value that is both predetermined and constant, with the N bits of the N bit encoding;

(c) an N+x bit pointer register means for holding said one N+x bit address, wherein said one N+x bit address provides to the execution unit a pointer to an information entry in the memory to be processed by the execution unit whereby the processor core can address $2^x$ times more memory locations than $2^N$.

3. A processor core that executes instructions retrieved from a memory, comprising:

(a) an execution unit that executes instructions;

(b) an N+x bit program counter register for holding one of a plurality of N+x bit addresses, wherein said one N+x bit address provides to said execution unit a pointer to an instruction in the memory to be executed by the execution unit;

(c) an encoding means for encoding said one N+x bit address into an N bit encoding of said one N+x bit address (d) a linkage register means for holding said N bit encoding of said one N+x bit address; and (e) a decoding means for decoding said one N+x bit address from said N bit encoding of said one N+x bit address held in said linkage register means whereby the processor core can address $2^x$ times more memory locations than $2^N$.

4. A processor core as in claim 3, wherein x bits of said N+x bits each has a value which is both predetermined and constant, and wherein said N bit encoding of said one N+x bit address is the other N bits of said one N+x bit address.

5. A processor core as in claim 4, wherein the x bits, each of which has a value that is both predetermined and constant, are the least significant x bits of said one N+x bit address and each of said least significant x bits has a value that is predetermined to be zero.

6. A processor core that executes instructions retrieved from a memory, comprising:

(a) an execution unit that processes instructions;

(b) a decoding means for decoding an N bit encoding of one of a plurality of N+x bit addresses into one of said plurality of N+x bit addresses by combining x bits, each of which has value that is both predetermined and constant, with the N bits of the N bit encoding;

(c) an N+x bit pointer register means for holding said one N+x bit address, wherein said one N+x bit address provides to the execution unit a pointer to an instruction in the memory to be retrieved from memory and executed by the execution unit whereby the processor core can address $2^x$ times more memory locations than $2^N$.

7. A method of retrieving information from a memory to a processor core, to be processed by an execution unit of the processor core, comprising:

(a) holding one of a plurality of N+x bit addresses in an N+x bit pointer register, wherein said one N+x bit address provides to the execution unit a pointer to an information entry in the memory to be processed by the execution unit;

(b) encoding said one N+x bit address into an N bit encoding of said one N+x bit address (c) holding said N bit encoding of said one N+x bit address; and (d) decoding said one N+x bit address from said N bit encoding of said one N+x bit address whereby the processor core can address $2^x$ times more memory locations than $2^N$.

8. A method of retrieving information from a memory to a processor core, to be processed by an execution unit of the processor core, comprising:

(a) decoding an N bit encoding of one of a plurality of N+x bit addresses into one of said N+x bit addresses by combining x bits, each of which has a value that is both predetermined and constant, with the N bits of the N bit encoding, wherein said one N+x bit address provides to the execution unit a pointer to an information entry in the memory to be processed by the execution unit;

(b) holding said one N+x bit address whereby the processor core can address $2^x$ times more memory locations than $2^N$.

9. A processor core as in claim 1, wherein x bits of said N+x bit address each has a value that is both predetermined and constant, and said encoding means encodes said N+x bit address by removing said x bits from said N+x bit address to generate said N bit encoding.

10. A processor core as in claim 9, wherein said x bits, each of which has a value that is both predetermined and constant, are the least significant x bits of said N+x bit address and each of said X bits has a value that is predetermined to be a constant zero.

11. A processor core as in claim 3, wherein x bits of said N+x bit address each has a value that is both predetermined and constant, and said encoding means encodes said N+x bit address by removing said x bits from said N+x bit address to generate said N bit encoding.

12. A processor core as in claim 11, wherein said x bits, each of which has a value that is both predetermined and constant, are the least significant x bits of said N+x bit address and each of said X bits has a value that is predetermined to be a constant zero.

13. A processor core as in claim 7, wherein x bits of said N+x bit address each has a value that is both predetermined and constant, and said encoding means encodes said N+x bit address by removing said x bits from said N+x bit address to generate said N bit encoding.

14. A processor core as in claim 13, wherein said x bits, each of which has a value that is both predetermined and constant, are the least significant x bits of said N+x bit address and each of said X bits has a value that is predetermined to be a constant zero.

* * * * *

UNITED STATES PATENT AND TRADEMARK OFFICE
CERTIFICATE OF CORRECTION

PATENT NO. : 5,566,308
DATED : October 15, 1996
INVENTOR(S) : Chaim Bendelac et al.

It is certified that error appears in the above-indentified patent and that said Letters Patent is hereby corrected as shown below:

On the cover page, section [21] Appln. No.:, delete "248,769" and replace with --248,768--.

Signed and Sealed this

Seventh Day of January, 1997

Attest:

BRUCE LEHMAN

*Attesting Officer*      *Commissioner of Patents and Trademarks*